United States Patent
Fisher et al.

(10) Patent No.: US 8,385,592 B2
(45) Date of Patent: Feb. 26, 2013

(54) DIGITAL WATERMARKING SYSTEM AND METHOD

(75) Inventors: William C. Fisher, San Clemente, CA (US); Stephen P. Roney, Ladera Ranch, CA (US)

(73) Assignee: Quicksilver Software, Inc., West Irvine, CA (US)

( * ) Notice: Subject to any disclaimer, the term of this patent is extended or adjusted under 35 U.S.C. 154(b) by 589 days.

(21) Appl. No.: 12/700,597

(22) Filed: Feb. 4, 2010

(65) Prior Publication Data

US 2010/0195866 A1 Aug. 5, 2010

Related U.S. Application Data

(60) Provisional application No. 61/149,851, filed on Feb. 4, 2009.

(51) Int. Cl.
*G06K 9/00* (2006.01)

(52) U.S. Cl. ........................................... 382/100

(58) Field of Classification Search ................. None
See application file for complete search history.

(56) References Cited

U.S. PATENT DOCUMENTS

| | | | |
|---|---|---|---|
| 2,612,994 A | 10/1952 | Woodland et al. | |
| 6,259,801 B1 | 7/2001 | Wakasu | |
| 6,285,775 B1 | 9/2001 | Wu et al. | |
| 6,449,380 B1 | 9/2002 | Acharya et al. | |
| 6,608,912 B2 | 8/2003 | Acharya et al. | |
| 6,664,976 B2 | 12/2003 | Lofgren et al. | |
| 6,671,387 B1 | 12/2003 | Chen et al. | |
| 6,795,566 B2 | 9/2004 | Acharya et al. | |
| 6,892,947 B1 | 5/2005 | Jam et al. | |
| 6,940,993 B2 | 9/2005 | Jones et al. | |
| 6,948,068 B2 | 9/2005 | Lawandy et al. | |
| 7,006,663 B2 | 2/2006 | Acharya et al. | |
| 7,227,972 B2 * | 6/2007 | Brundage et al. | 382/100 |
| 7,239,418 B2 | 7/2007 | Mori | |
| 7,302,577 B2 | 11/2007 | Pelly et al. | |
| 7,352,877 B2 | 4/2008 | Fujikawa et al. | |
| 7,447,329 B2 | 11/2008 | Choi et al. | |
| 7,653,211 B2 * | 1/2010 | Kogure et al. | 382/100 |
| 2002/0095577 A1 | 7/2002 | Nakamura et al. | |
| 2002/0178362 A1 | 11/2002 | Kwon | |
| 2003/0058257 A1 | 3/2003 | Yin | |
| 2005/0018845 A1 | 1/2005 | Suzaki | |
| 2005/0144456 A1 | 6/2005 | Acharya et al. | |
| 2005/0237572 A1 | 10/2005 | Mori et al. | |
| 2006/0120562 A1 | 6/2006 | Fudge et al. | |
| 2007/0108287 A1 | 5/2007 | Davis et al. | |
| 2007/0172096 A1 | 7/2007 | Komatsubara et al. | |
| 2007/0183626 A1 | 8/2007 | Hashimoto et al. | |
| 2007/0201099 A1 | 8/2007 | Eguchi et al. | |
| 2008/0151311 A1 | 6/2008 | Sharma et al. | |
| 2009/0067671 A1 | 3/2009 | Alattar | |
| 2009/0080688 A1 | 3/2009 | Au et al. | |
| 2009/0123026 A1 | 5/2009 | Rhoads | |
| 2009/0172404 A1 | 7/2009 | Kim et al. | |

(Continued)

OTHER PUBLICATIONS

International Search Report, PCT/US10/23240, May 18, 2010.

*Primary Examiner* — Claire X Wang

(74) *Attorney, Agent, or Firm* — Greenberg Traurig LLP

(57) ABSTRACT

Embodiments of the invention provide a digital watermarking system and method for producing watermarked images from a sequence of original images. The system includes a storage unit and a processor to encode watermark data, create a watermark bitmap template of the encoded watermark data, load and scale the original images, composite the watermark bitmap template and the scaled original images to produce the watermarked images, and store the watermarked images. The system can also produce a single watermarked image from a single original image.

21 Claims, 6 Drawing Sheets

U.S. PATENT DOCUMENTS

2009/0174910 A1 7/2009 Kuraki et al.
2009/0202103 A1 8/2009 Fujii et al.
2010/0002907 A1 1/2010 Wang et al.
2010/0005305 A1 1/2010 Dixit

* cited by examiner

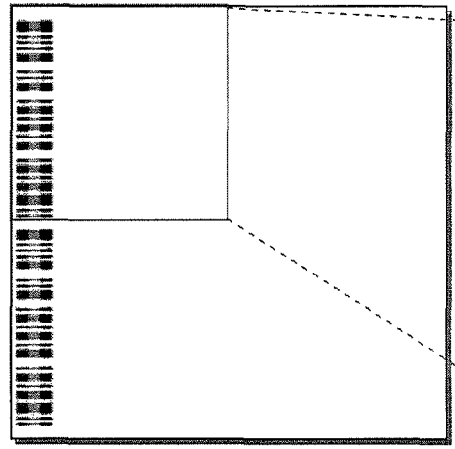
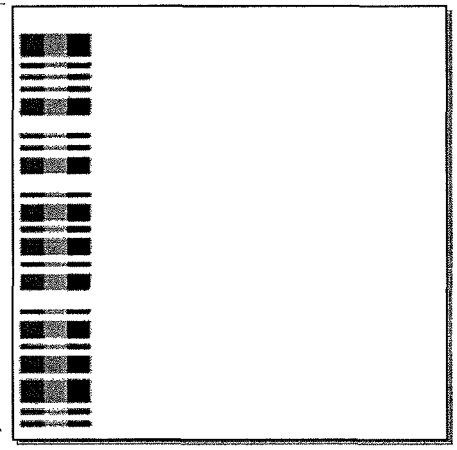
FIGURE 4A  FIGURE 4B
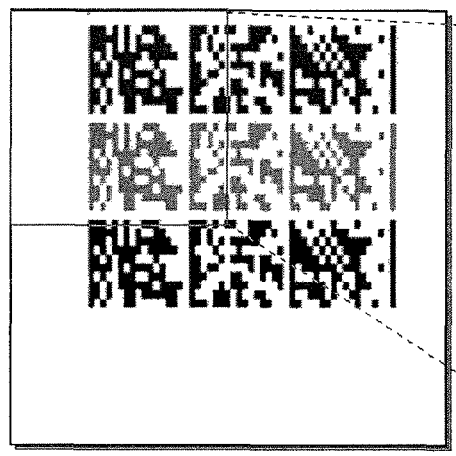
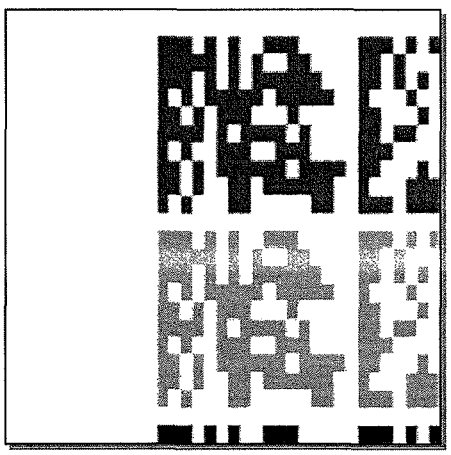
FIGURE 5A  FIGURE 5B

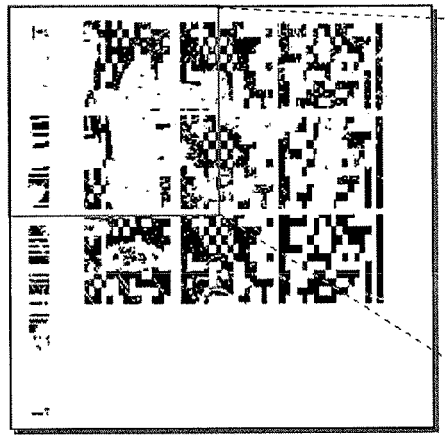 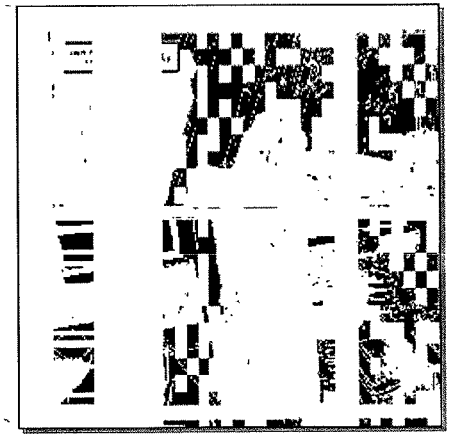
FIGURE 6A  FIGURE 6B
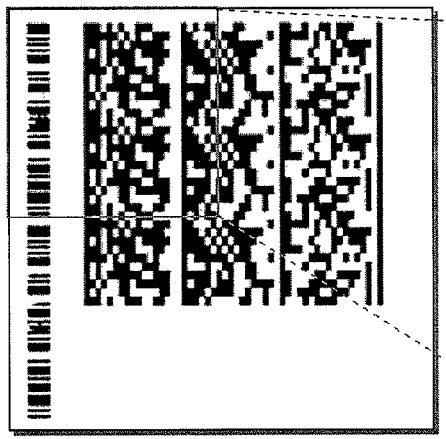 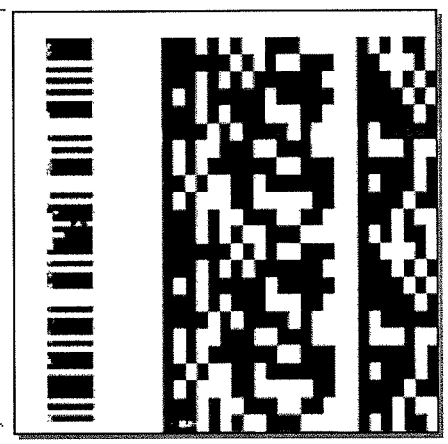
FIGURE 7A  FIGURE 7B

DIGITAL WATERMARKING SYSTEM AND METHOD

RELATED APPLICATIONS

This application claims priority under 35 U.S.C. §119 to U.S. Provisional Patent Application No. 61/149,851 filed on Feb. 4, 2009, the entire contents of which is incorporated herein by reference.

BACKGROUND

Digital information, such as digital images, digital videos, and digital photos, is often distributed by storage media or through a network. Watermarking systems are used to track the digital information by adding a unique, often hidden identifying mark (e.g., a "watermark") to it, such that violators who inappropriately distribute the digital information can be identified through recovery of the watermark. However, the digital information can undergo extensive processing after being distributed, causing the watermark to be removed or degraded to the point that the digital information becomes effectively untraceable.

SUMMARY

Some embodiments of the invention provide a digital watermarking system for producing a watermarked image from an original image. The system includes a storage unit which tangibly stores watermarking algorithms, the original image, watermark data, and the watermarked image. The system also includes a processor which executes the watermarking algorithms to encode the watermark data and create a watermark bitmap template at a first desired size and resolution, where the watermark bitmap template includes at least one watermark bitmap of the encoded watermark data. The processor also executes the watermarking algorithms to load and scale the original image to a second desired size and resolution and composite the watermark bitmap template and the scaled original image to produce the watermarked image by aligning the watermark bitmap template and the scaled original image, and programmatically modifying pixel values of the scaled original image near positions where the watermark bitmap and the scaled original image overlap. The processor further executes the watermarking algorithms to store the watermarked image in the storage unit.

Some embodiments of the invention provide a method for watermarking a sequence of original images. The method includes providing a computer including computer readable storage media for tangibly storing watermarking algorithms and a processor for executing the watermarking algorithms. The method also includes encoding watermark data and creating at least one watermark bitmap template at a first desired size and resolution. The watermark bitmap template includes at least a portion of the encoded watermark data in the form of a barcode. The method further includes loading and scaling each of the sequence of original images to a second desired size and resolution, compositing the at least one watermark bitmap template and each of the sequence of scaled original images to produce a sequence of watermarked images, and storing the sequence of watermarked images in the computer readable storage media.

DESCRIPTION OF THE DRAWINGS

FIGS. 4A and 4B illustrate an image of a page identifier watermark.

FIGS. 5A and 5B illustrate an image of a watermark template.

FIGS. 6A and 6B illustrate an image of an extracted watermark.

FIGS. 7A and 7B illustrate an image of a plurality of extracted watermarks superimposed over each other.

DETAILED DESCRIPTION

Figure 1:
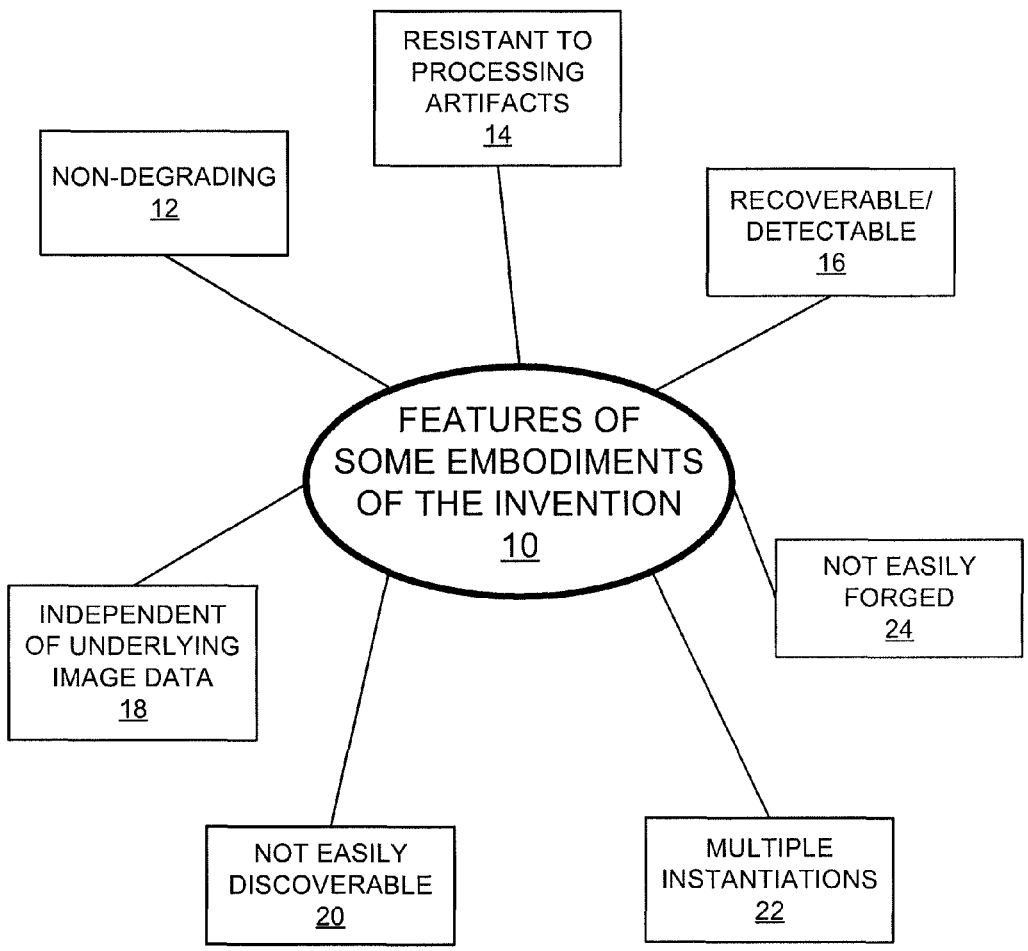
FIG. 1 illustrates features of a digital watermarking system according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Some embodiments of the invention provide a digital watermarking system as a minimally-invasive mechanism for uniquely identifying digital images. The system can be used to protect information such as a sequence of digitally represented, or "bitmapped", graphical images. For example, the system can ensure that images delivered over a network, such as the internet, can be identified and traced back to their origin if they were inappropriately released.

Some embodiments of the system can use an "original image", which can be an uncompressed, non-watermarked, high-resolution bitmap image. For identification or tracking purposes, "watermark data" (further described below) can be encoded into a bitmap image or image set (i.e., as a "watermark bitmap"). The system can integrate the watermark bitmap within the original image to create a "watermarked original." The watermarked original can be an uncompressed bitmap with resolution and image quality properties similar or equal to the original image. A "watermarked image" can be a watermarked original that has been compressed, altered in image quality, or is at a different resolution than the original image. In addition, a "processed image" can refer to a watermarked image that has been additionally processed. The processes used to prepare a watermarked original from an original image (further described below) can be generally referred to as "watermarking." Thus, the system can prepare a watermarked original by watermarking an original image and can process the watermarked original to create a final processed image.

The watermarked original, the watermarked image, and/or the processed image can be referred to as user images, as any of these images can be made public, according to some embodiments of the invention. For example, an owner of the original image can privately store the original image and only release the user images (i.e., the watermarked originals, watermarked images, and/or processed images) to certain users. Each of the certain users can have a user image including unique watermark data. As a result, if a user image is inappropriately released, the owner can use the watermark data to identify who the user image belonged to.

When the original image includes a sequence of images (e.g., a comic book or book), some embodiments of the system can encode a portion of the watermark data into each of the sequence of images without encoding all of the watermark data into a single one of the sequence of images. Thus, the watermark data can refer to more than just a set of elements that are encoded directly into a bitmap image and can be mapped using certain characteristics of the bitmaps in the sequence.

Rather than a single technique or algorithm, watermarking processes used by some embodiments of the system can be a general set of rules and guidelines with specific design requirements such that they produce results with particular characteristics. When referring to a "watermarking algorithm" or "algorithm" throughout the specification, this does not imply that the system is restricted to using only one possible process for affecting the data in the original image. The system can exist in one instantiation in some embodiments and can also exist in an unlimited number of other, equally viable instantiations in other embodiments.

Features 10 of some embodiments of the system are summarized in FIG. 1. As shown in FIG. 1, the system can include watermarking processes that are non-degrading 12, resistant to processing artifacts 14, recoverable/detectable 16, independent of underlying data 18, not easily discoverable 20, available in multiple instantiations 22, and/or not easily forged 24. The following paragraphs further describe these features 10. In some embodiments, a combination of one or more of these features 10 is achieved by the system.

Some embodiments of the system can include the non-degrading feature 12 such that, to the greatest extent practical, watermarking performed by the system does not alter the appearance of the user image in such a way that a normal observer would perceive a degradation in image quality compared to the original image. The non-degrading feature 12 can be accomplished even when the observer employs various simple adjustments to the user image, such as contrast changes, bit depth changes, or resizing of the image (i.e., a processed image would still not be perceived as being degraded compared to the original image).

Another feature of some embodiments of the system can be that the watermark bitmap is resistant to processing artifacts 14. For example, the watermark bitmap should remain at least partially detectable even if the watermarked original has been processed using common image alteration tools. In particular, the watermark bitmap can still be detectable even if the watermarked original is compressed using certain standard image compression techniques such as JPEG or PNG. In addition, the watermark bitmap can be detectable even in a processed image, although it may be degraded to the point that the original watermark data may not be fully recoverable.

Some embodiments of the system can also include the recovery and detection feature 16, such that the watermark bitmap in a watermarked image or processed image is recoverable, or at least detectable, to a person with access to certain information about the original image. Generally, the information necessary for detection or recovery of the image may not be available to end users. In this context, recoverable can mean that there exists some algorithm through which the original watermark data which was stored in the watermark bitmap can be reliably reconstructed from the user image. Detectable can mean that there exists some algorithm through which the probable existence of the watermark bitmap can be ascertained from examination of the user image or application of various algorithms to the data even if the original watermark data cannot be reliably reconstructed.

Yet another feature of some embodiments of the system can be that the watermark bitmap is independent of underlying image data 18. As a result, to the greatest extent practical, the watermark bitmap can remain visible regardless of specific original image bitmap data. In some embodiments, specific watermark algorithms can have limitations in which they cannot be applied to certain classes of original images, while other watermark algorithms can be equally limited (or not limited at all) by similar classes of original image data. For example, some embodiments of the system can watermark original images that are somewhat complex (i.e., mathematically, the images contain relatively high-frequency content such as photographs, drawings or computer-generated renderings). Some embodiments of the system can also watermark original images with simple gradients or black-and-white text documents in some embodiments, but the result may not be effectively recoverable.

Some embodiments of the system can also include the feature 20 such that the watermark bitmap, and watermark data, is not easily discoverable. More specifically, an observer should not be able to easily recover information contained within a watermark bitmap in an arbitrary watermarked image, even if that observer is informed of the presence of the watermark bitmap. Trivial or obvious techniques, common steganographic techniques, and/or common cryptographic techniques should not reveal enough information for the observer to be able to uniquely identify the information contained in the watermark bitmap.

Some embodiments of the system can further include the multiple instantiations feature 22, where the system can create multiple different instantiations of the algorithms used by any given implementation. As a result, the type of protection afforded to new original images may not necessarily be the same as that provided to older ones. More specifically, implementations by some embodiments of the system can provide "hooks" allowing customization of many aspects of the watermarking process. The system can thus allow variation among protected properties, this being one of the most powerful weapons against users who would try to circumvent such protection.

Some embodiments of the system can also include the feature 24 such that the watermark bitmap, and watermark data, is not easily forged. There can be little to gain by forging watermarks since they are not the primary method of preventing someone from accessing the protected images. However, there can be value in being able to assert that the watermark has been created by a legitimate, licensed creator and not an impostor. For example, by making it difficult for someone to create watermarks which appear to be genuine but are not, this feature can prove useful in some legal arguments.

Figure 2:
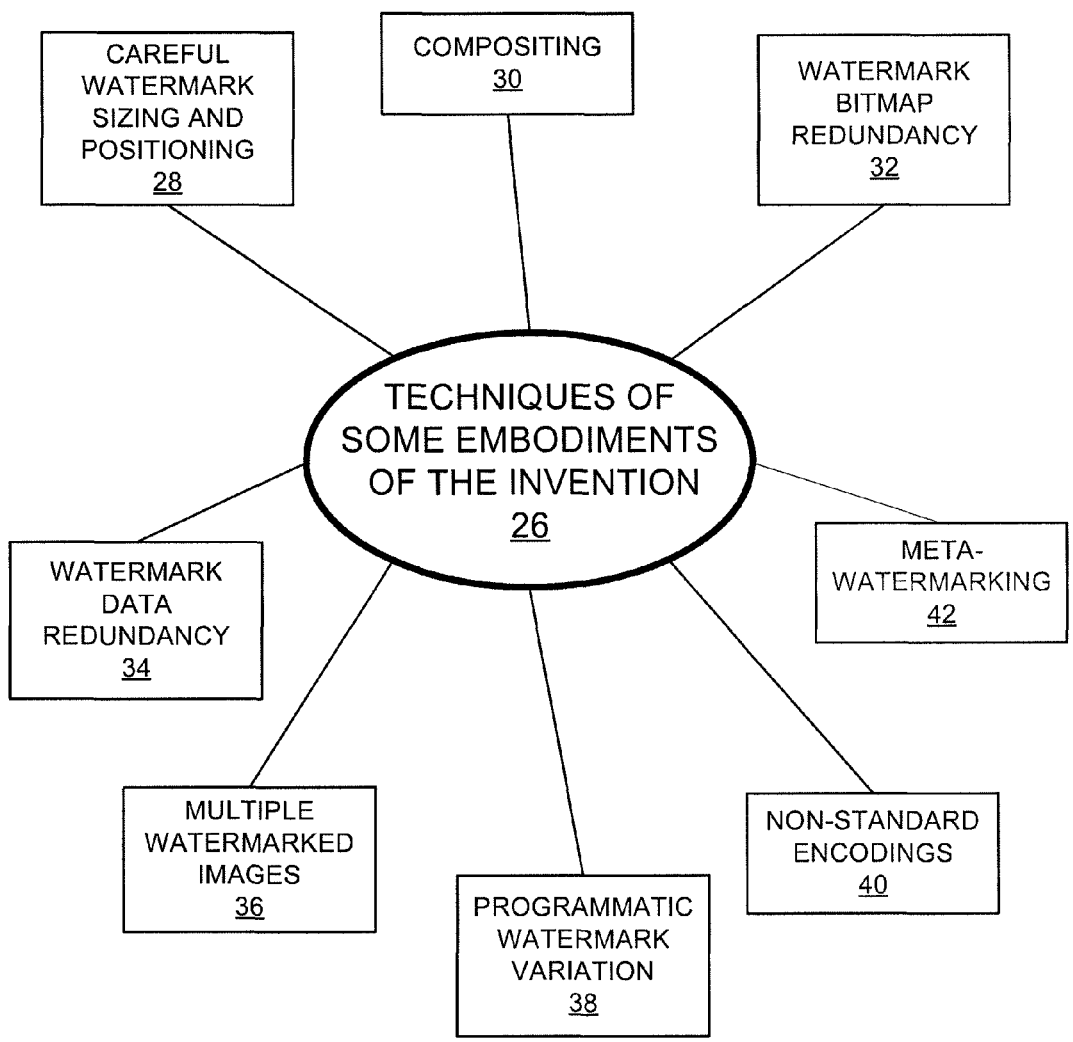
FIG. 2 illustrates techniques performed by a digital watermarking system according to one embodiment of the invention.

FIG. 2 illustrates information concealment techniques 26, according to some embodiments of the invention, that are employed by the system. The techniques 26 can include careful watermark sizing and positioning 28, compositing 30, watermark bitmap redundancy 32, watermark data redundancy 34, watermarking multiple images 36, programmatic watermark variation 38, non-standard encodings 40, and meta-watermarking 42. Instructions for carrying out one or more of the techniques 26 can be stored as watermarking algorithms.

Some embodiments of the system can combine one or more of the techniques 26 to allow recovery of concealed information including complete original information content of a watermark bitmap even from a protected property which has been degraded by the use of lossy compression algorithms such as JPEG. The specific combination and sequence of techniques 26 used by some embodiments of the system can be uniquely effective in achieving the features 10 shown in FIG. 1.

Regarding the careful watermark sizing and positioning technique 28, attention can be paid to the size and location of the watermark bitmap relative to the original image. For example, individual watermark data elements in the watermark bitmap can be large with respect to the pixels in the original image. In one embodiment, the individual watermark data elements can be at least about eight times the size of a pixel in both the X- and Y-axes of the original image. In addition, the individual watermark data elements in the watermark bitmap can each be rectangular and a multiple of eight pixels wide and high. The individual watermark data elements in the watermark bitmap can also be aligned with an eight-pixel, sixteen-pixel, or other fixed-integer pixel boundary in the X and Y (i.e., horizontal and vertical) directions. For example, in some embodiments, the top left corner of a given data element can be located at (X,Y) coordinates (8,8) or (8,16), rather than at coordinates (9,8) or (8,15). The positioning technique 28 can improve the ability of the system to identify watermarked images and to extract meaningful information from them.

The individual watermark data elements in the watermark bitmap can also be graphically very simple. Some embodiments can include watermark data elements that are monochromatic blocks (e.g., either a solid single color or a solid white) while other embodiments can include multi-colored blocks of watermark data elements. If each watermark data element is very consistent in its coloration, however, detectability can be significantly improved. The watermark bitmap can be a one-dimensional ("1D") barcode, a two-dimensional ("2D") barcode, or a unique graphical element.

Regarding the compositing technique 30, the watermark bitmap can be incorporated into the original image using one or more standard graphical compositing algorithms, resulting in the watermarked original. Each watermark data element in the watermark bitmap can be comprised of a single color, such as red (R), green (G), or blue (B). With a proper compositing algorithm, this can ensure that the watermark data element affects only a subset of the channels in the image, which can minimize the absolute difference in each pixel and can increase resiliency against graphical processing or deliberate attempts at obfuscation. In some embodiments, compositing modes can include, in Adobe® Photoshop® terminology, "multiply" and "color."

The watermark bitmap can also be extremely faint in the watermarked original. In a normal RGB888 image (i.e., 24 bits per pixel, eight bits each for red, green and blue), the watermark bitmap can be composited at a percentage between about 1% and about 3% of the color range on one channel. This can equate to a difference in the numerical values of the red, green or blue in the image amounting to no more than about 7 out of 255, and typically much less. Such subtle variations can be easily hidden in relatively complex visual content.

The compositing algorithm can be selected such that it minimizes the appearance of sharp thresholds in the resulting image. For example, the watermark bitmap can contain very sharp thresholds due to the fact that each individual watermark data element is a rectangular element, resulting in high contrast between subsequent elements (i.e., between two or more colors). As a result, compositing can be deemed unacceptable for use in areas where it would cause gray blocks to appear on a black background, as many images can have contiguous regions of black pixels within which a very clear line might be perceived. This would violate the feature 20 of the watermark not being easily discoverable. The compositing technique 30 can thus be considered a lossy process, because the compositing algorithm can determine and apply no change to the original image on some pixels that were to include the watermark bitmap. As a result, it is possible that some areas of the watermark bitmap can be completely lost or significantly degraded and therefore at least partially unrecoverable. However, this can be taken into consideration and the losses can be alleviated by some of the techniques 26 further defined below.

Regarding the watermark bitmap redundancy technique 32, depending on the size of the final image, more than one copy of the watermark bitmap or variations of the watermark bitmap can be composited onto the original image. This can increase the odds of being able to recover a complete copy of the watermark bitmap. In addition, in some embodiments, each copy of the watermark bitmap can be rendered in a different color (e.g., each watermark bitmap can use a different single color channel) or multiple color channels (identical or differing) can also be used for each copy or variation of the watermark bitmap.

As noted above, the top left corner of each watermark bitmap can be located on an eight-pixel boundary or other fixed-interval pixel boundary. Since each watermark data element can also be a multiple of a fixed number of pixels wide and high, this can ensure that every data element in the entire image remains on a fixed-interval pixel boundary. Although some embodiments can implement the same compositing algorithm for each copy of the watermark bitmap, different algorithms can be used and some additional redundancy can be achieved through the careful selection of multiple methodologies.

One aspect of the watermark bitmap redundancy technique 32 can be the location of the watermark bitmap identified during the recovery process. Because of the nature of the watermark bitmap, there can be many ways to recover the watermark bitmap, including ways that do not require prior knowledge of the watermark bitmap's position. As a result, protection algorithms can be used by the system to alter the location of the watermark bitmap in a sequence of images, for example, such that the watermark bitmaps at are not placed at the same location in each image of a particular image sequence.

Regarding the watermark data redundancy 34 technique, in some embodiments, the watermark bitmap can be created as a barcode (e.g., a two-dimensional barcode) with built-in data checksums and cross-checks. The cross-checks can increase the likelihood of recovery of the watermark data from the image, even if some portion of the watermark bitmap is damaged.

Regarding the watermarking multiple images technique 36, some embodiments of the system can be used to watermark multiple items such as a sequence of bitmap images. Each image can be watermarked with some or all of the watermark data. Thus, in some embodiments, a certain subset of the images must be made available in order for the protected information to be recovered. In addition, when each image is watermarked, the odds of being able to recover a complete watermark bitmap and therefore recovering the original watermark data are very much enhanced.

Regarding the programmatic watermark variation technique 38, some embodiments of the system can be used to watermark a sequence of bitmap images consisting of multiple levels of content, such as chapters of a book. In such embodiments, the watermark bitmap can be changed for each chapter. The watermark bitmap can be first based on the book's unique ID code. Each chapter can add a unique chapter-level identifier to the book ID to programmatically produce a chapter-specific watermark bitmap. The identifiers can be watermarked as 1-dimensional or 2-dimensional barcodes, as noted above, although other methods of representing the watermark data can be used in other embodiments.

In addition, programmatic variation of watermark data can be used to create more unique chapter-specific watermark bitmaps. This can be performed to solve the problem that 2D barcodes of very similar text strings look almost identical to the naked eye and, sometimes, to image recognition algorithms. If each chapter watermark bitmap looks very different, the odds of being able to definitively identify the watermark bitmap are increased because there will be fewer nearly-identical possibilities between which an algorithm must differentiate. For example, FIGS. 5A-5B and 7A-7B illustrate watermarked images for different chapters in the same book.

In one embodiment, to accomplish the different watermarking by chapter, the characters in the string representing the chapter ID can be permuted or "rotated" before being encoded. This can change sequential chapter watermark bitmaps dramatically, yet still allow the original string of watermark data to be easily extracted from the decoded data. In another embodiment, an encryption algorithm or hash on the book ID can be used. This can also result in vastly different content for each chapter watermark bitmap. In yet another embodiment, programmatic variation in the raw representation of the Book ID (e.g., using a simple "XOR" operation on one or more bytes of the string) can be accomplished. This operation can be trivially reversible by someone with knowledge of what modification had been performed, yet it can cause the string to look incorrect to the naked eye. The owner or creators of the images can maintain knowledge of the protection algorithm in a proprietary database to know which such permutations are done to which watermark data elements.

The non-standard encoding technique 40 can be accomplished by, for example, modifying standard encodings used in the various layers of protection afforded by the watermarking process. This technique 40, which can be known as "security through obscurity," can serve to erect additional barriers of protection on a user image. Furthermore, the modifications can be different for each version of the system or even for each product (i.e., single images or sequences of images) protected by the system. The exact form of the modifications can be effectively unlimited, however, in some embodiments, only non-destructive modifications can be used (e.g., a destructive modification can be one in which certain bytes of a data element are always altered). The non-standard encoding technique 40 can also aid in the ability to identify an image as authentic and not a forgery, since a forger might not necessarily possess the knowledge of the particular non-standard methods used and would therefore encode the same information in a different manner.

For example, in one embodiment, the modification can be accomplished through a method by which the 2D barcode for a chapter ID is created by an implemented "Algorithm B." Algorithm B can control some embodiments of the system to generate a standard 2D barcode as a watermark bitmap, then truncate the left-most section of the watermark bitmap, where the left-most section provides an identification marker for a recognition algorithm. This section can be the same for every barcode of the designated type and therefore it would not be necessary to composite the section on each original image. The recovery algorithms of some embodiments of the system can first add the left-most section back to the 2D barcode before attempting to decode its watermark data. The result of the omission of some of the bits of the barcode makes it harder for someone attempting to break the encoding scheme to understand what type of barcode is being used. This would be an obstacle that would take some time to overcome, which is always a competitive advantage in protection algorithms.

In another example, the modification can be accomplished by creating a slight corruption of certain watermark data elements. Some embodiments of the system can use an "XOR" operation on a few bytes of an image in a deterministic fashion which is easily reversible to someone who knows what changes were made. While this does very little to protect the original image data from a formal cryptographic standpoint, it can be a significant impediment to the decoding of the watermark data because the corruption algorithm does not have to follow any commonly recognizable pattern. There can be nearly infinite variations of what can be done, where the only way to truly determine the algorithm would be to locate and decompile the object code for the algorithm, which is illegal.

Each separate instantiation of the system can be designed to use a different non-standard method of corrupting the data. Cryptographically, such methods can be extremely weak by themselves, but they will cost time and effort on the part of those who would attempt to circumvent the protection, and that can be valuable when coupled with the ability to change the protection every time a new product is released. In an example case, a prospective thief would need to decipher the object code every time a new version of the software was released. And that process, especially when the code is intentionally designed to be difficult to decompile, can be quite time-consuming.

Regarding the meta-watermarking technique 42, some embodiments of the system can encode information not only in images, but in the groups of images or even in groups of groups. It can be possible for a given package to be customized so that it is different in some way for every user. For example, every image or every chapter can include several different watermarks and each user can receive a unique combination of those watermarked images or chapters. A meta-watermark can be considered the unique combination of watermarks placed on the watermarked images or chapters.

In one embodiment, the watermark bitmaps can be associated with a specific recipient user. As a result, if the watermark bitmaps in each image or chapter in the product were identified, the user who received the product can be uniquely identified. Many methods for implementing watermark variation can be possible. For example, subtle changes to the barcode can be accomplished or separate marks can be placed on the image or images to indicate which variation of the meta-watermark was used.

In one embodiment, each chapter of a book is created using four different watermarks. Each copy of the complete book delivered to a user (i.e., a customer) can use a different sequence of watermark bitmaps in the chapters. The sequence of chapter watermark bitmaps can then be, in effect, a unique number that can be used to identify the user. For example, using chapter watermark bitmaps named 1, 2, 3 and 4, a book of ten chapters could be represented by a ten-digit string. If the book is released with the chapter watermarks in the order "2314231412" and a book with chapters encoded that same way is found on an internet download site, it can be easy to demonstrate that the copy originated from a specific individual. The more chapters or pages in the book, the easier it can be to demonstrate the uniqueness of the origin of the book. In other embodiments, variations can be performed to group images into collections other than chapters, such as grouping every tenth page together or grouping every three consecutive pages together.

Figure 3:
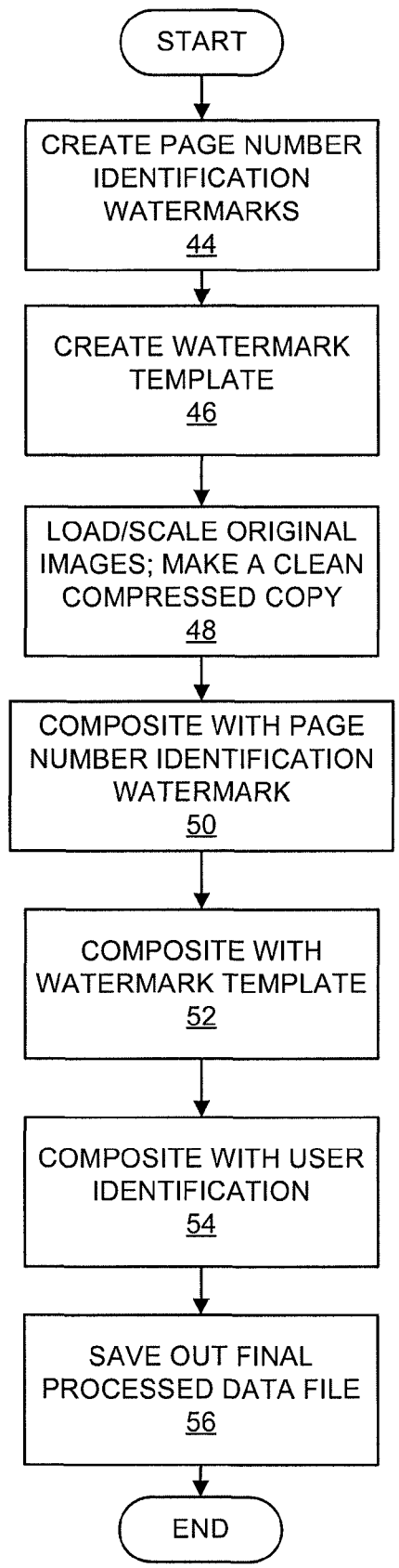
FIG. 3 is a flow diagram of a process of a digital watermarking system according to one embodiment of the invention.

FIG. 3 illustrates a processing sequence used by the system, in some embodiments of the invention, to create a final set of watermarked images. At step 44, the system can create page number identification watermark bitmaps. Page number identification watermark bitmaps can be created to have the same or lesser resolution and fit within a designated target size of the watermarked image, with all components aligned as they should appear on each watermarked image. The page number identification watermark bitmaps can be designed to contain a bitmap representation of a page number of the specific image within a chapter or book. These can be created using an open-source barcode generation algorithm, then optionally duplicating it several times in several colors (e.g., for redundancy).

The page number identification watermark bitmaps can exist as a secondary mechanism to prove the original images were watermarked using the system. More unique than a simple logo, the watermarked image can be compared with the original image and, even if it cannot be readily decoded, the existence, position, and relative sizes of the blocks of color located on a recovered image can be useful in establishing the strong probability that the image was indeed part of a image collection protected by the system.

In one embodiment, the page number identification watermark bitmap can be a barcode with a simple one-dimensional format called "Code 2 of 5". In accordance with the non-standard encodings technique 40 described above, the barcode can be modified by removing any human-readable text at its bottom, then enlarged so all bars are at least eight pixels wide, rotated 90 degrees and placed at coordinates which are a multiple of eight. The resulting base image of a page identifier watermark bitmap is illustrated in FIG. 4A, where FIG. 4B is a close-up of the top left corner of the page identifier watermark bitmap. The page identifier watermark bitmap of FIGS. 4A-4B also demonstrates the watermark bitmap redundancy technique 32, as multiple copies of the barcode, each with a single color channel, can easily be incorporated in order to enhance detectability.

At step 46, the system can create a watermark bitmap template. The watermark bitmap template can be at the same or lesser resolution as a designated target size of the watermarked image, with all components aligned as they should appear on each watermarked image. Some embodiments can include particular information within the watermark bitmap template, while other embodiments can include different information. For example, the watermark bitmap template can be designed to contain watermark information such as one or more specific logos and/or various indicators identifying a version of the software performing the processing. The watermark bitmap template can also include a tag indicating that the data file is an internal development file, which can be useful when attempting to trace leaks. In addition, the watermark bitmap template can include watermark information such as details of a specific international standard book number (ISBN), stock keeping unit (SKU) and/or components of the ISBN or SKU. In addition, the watermark bitmap template can contain a product-specific watermark bitmap. This can be an arbitrary type of bitmap, such as a logotype, a barcode, or another image. The other image can be a simple image rendered at a large size in order to enhance recoverability.

The above indicators together can become a unique number or string identifier for the product, encoded as a redundant barcode or other visual representation. The watermark bitmap template can be created using an open-source barcode generation package of other utility software, then duplicated several times in several colors.

FIG. 5 illustrates a watermark bitmap template that is a barcode containing encoded book identification and chapter number information. The information can include a publisher identification code, an SKU number, a version number, a publication date, an indicator of whether advanced content is incorporated, and a chapter number. The encoding of FIG. 5 can illustrate the following string: "IMG-00001-001-2009-B-N-001".

The image size of FIG. 5 can be a 1175-pixel square (i.e., 1175 pixels wide by 1175 pixels high). Each block in the barcode can be 16 pixels wide and 24 pixels high. In addition, there is no space between adjacent watermark data elements, which can ensure that each watermark data element is aligned properly, in accordance with careful watermark sizing and positioning technique 28 described above.

At step 48, the system can load and scale original images and make a clean compressed (e.g., JPEG) copy of each original image. First, the original images can be scaled to a target resolution and size of the desired watermarked original (in some instances, all frames in a collection are the same size). The scaled original images can then be "raw," uncompressed and uncompromised data files at the desired resolution of the final material. The raw original image data files can be named with a consistent numbering scheme so that file names can be constructed algorithmically for all elements in the collection. For example, a first raw file can be "GIRL_pg01_f.tif." Next, a clean, compressed master image can be saved in a compressed format at a target resolution. This file can be used to later enable watermark detection and can be named accordingly (e.g., "GIRL_pg01_f_MASTER_JPEG90.jpg"). In some embodiments, the target resolution can be between about 100 dots per inch (DPI) and about 150 DPI, depending on the material.

At step 50, the system can composite the raw original image with the page number identification watermark bitmap. A compositing mode used at step 50 can be comparable to Adobe® Photoshop® "color" or "multiply" layer styles. The percentage opacity can be extremely low, such as around about 1% (or up to about 3%). The page number identification watermark bitmap file from the first step 44 can be at the same target resolution and size as the desired watermarked original. As a result, the raw original image and the page number identification watermark bitmap can align correctly when their top left corners are positioned at (0,0). The file name of the composite image can have a numeric sequence identifier that can be used to construct file name algorithmically for all elements in the collection. In some embodiments, a separate page number identification watermark can be encoded onto each layer of a layered image (for example, in production stages).

At step 52, the system can composite the raw original image with the watermark bitmap template. A compositing mode used at step 52 can be comparable to Adobe® Photoshop® "color" or "multiply" layer styles and the percentage opacity can be extremely low, such as around about 1% (or up to about 3%) in order to ensure that the image modification is essentially invisible to normal viewing and analysis. The watermark bitmap template files from step 46 can be at the same target resolution and size as the desired watermarked original. As a result, the raw original image and the watermark bitmap template can align correctly when their top left corners are positioned at (0,0). A numeric sequence identifier can be used to construct file names of the new composite images algorithmically.

At step 54, the system can composite the raw original image with a user identifier. The system can encode information specific to an individual user into each raw original image, usually via another watermark bitmap. This step can be optional in some embodiments and can be performed before delivery to individual users. The advantage of step 54 can be that it increases the likelihood of identifying a specific user when only a small number of watermarked images are available in the sequence or collection. Therefore, step 54 can be most useful in protecting collections which in total contain small amounts of images.

At step 56, the system can store final processed image data files. A compression method can be used to compress the files at a quality level at the desired target resolution. In some embodiments, this can be a JPEG image at somewhere between 80% and 95% quality. An example file name for the final processed image data file can be "GIRL_pg01_f_JPEG90.jpg"

The watermarking technology of some embodiments of the system is only valuable if it is possible to recover the watermark bitmap from a user image. The following paragraphs describe a recovery process as practiced in some embodiments.

FIGS. 6A and 6B illustrates a resulting image (original size 1175×1175 pixels) that was extracted by comparing an original image and a watermarked image of a comic book. The extraction process was performed by an algorithm where each pixel of the red, green and blue channels of a JPEG version of the original image was subtracted from the corresponding pixel of a watermarked JPEG at the same resolution, resulting in a gray-scale master image. The contrast was enhanced and the image was converted to a black-and-white single-channel bitmap. Even in the degraded condition shown in FIGS. 6A and 6B, it is quite obvious that the markings detected within the released JPEG image are part of a watermark bitmap. It would be unlikely for someone to argue convincingly that the markings in FIGS. 6A and 6B appear in such a form purely by random processes unrelated to the invention. In some embodiments, the extraction process can include other mathematical algorithms to compare color channels of the original image with corresponding color channels of the watermarked image.

In the image of FIGS. 6A and 6B, as expected, the watermark bitmap is significantly degraded and some areas are missing entirely. This can sometimes be the result of the content of the original image. For example, comic book images can contain many solid black areas (e.g., margins and gaps between frames) and many solid white areas (e.g., text bubbles). However, the watermark has survived the encoding process despite degradation caused by the use of JPEG compression. JPEG compression can be considered a lossy algorithm which throws away data, with a specific preference for high-frequency (i.e., high-contrast) elements. A JPEG compression system often works on 8×8 pixel meta-blocks, compressing each one separately. The reason for the edges of the barcode blocks remaining extremely sharp can be a result of the careful positioning and sizing techniques 28 used by some embodiments of the system.

As shown in FIG. 6A, there are three copies of the watermark bitmap (in accordance with the watermark redundancy technique 32). As a result, areas which are missing from one copy are not missing from another, and thus, one can layer all three of the recovered copies on top of one another to retrieve a more complete image. In addition, in accordance with the multiple watermarked images technique 36, the image of FIGS. 7A and 7B is a combination of watermark bitmaps extracted from nine pages in a chapter of a book. Each page was watermarked individually and the results were added together to obtain a very high-contrast recovered version of the original watermark bitmap. The page number identification watermarks on the left are not readable, however, because the different values from each page are now superimposed, but they are clearly present.

The main watermark bitmap in FIGS. 7A and 7B is very clear and can be very easily decoded using standard 2D barcode reading software. Once the left-side barcode identification watermarks are put back in place, errors in the barcode can be repaired using error correction software. In one embodiment, the barcode can be designed to handle a certain number of separate errors (e.g., four) and still be readable.

The embodiments described above mainly focus on watermarking a sequence of images in a book or comic book. However, in other embodiments, the system including the features and techniques described above can be used for protecting libraries of digital photographs, providing a method of digitally signing visual content, protecting digital video sequences (i.e., as large sequences of digital images), and/or authenticating visual reproductions.

Figure 8:
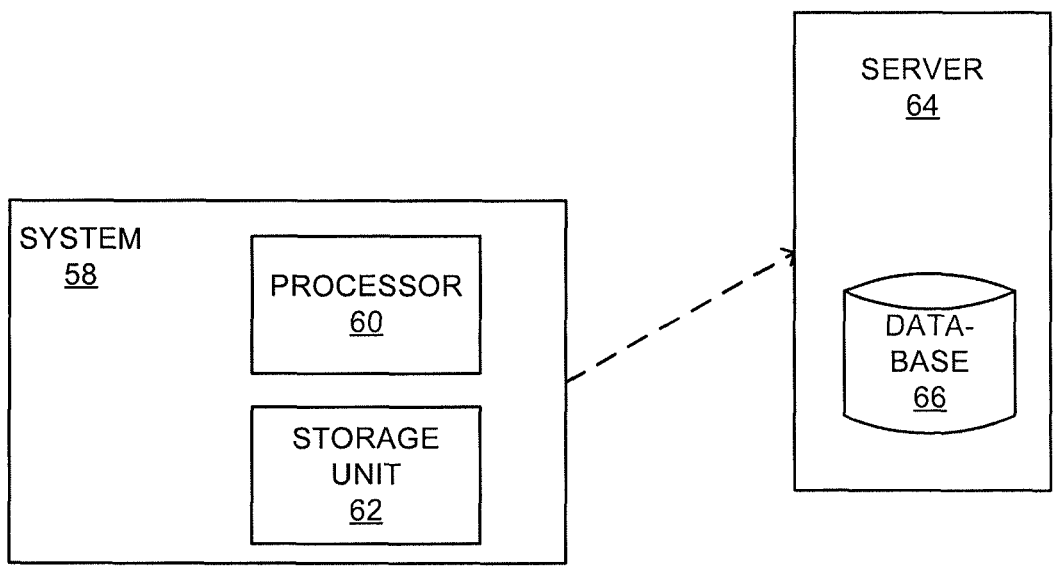
FIG. 8 is a block diagram of a digital watermarking system according to one embodiment of the invention.

FIG. 8 illustrates the system 58 according to one embodiment of the invention. The system 58 can include a processor 60 and a storage unit 62. For example, in one embodiment, the system 58 can be a computer. The processor 60 can execute operations of the system 58 as instructed by algorithms stored in the storage unit 62. In some embodiments, the algorithms can be in the form of computer program code to cause the system 58 to carry out the techniques described above as well as other operations. The algorithms can also be collectively stored as a single executable watermarking program. Another set of algorithms can be collectively stored as an executable watermark recovery program in order to recover watermark bitmaps, as described above. The storage unit 62 can be a computer-readable medium, as further described below, which may or may not be in direct connection with the processor 60. In addition, the storage unit 62 can store original images, watermark data, watermark bitmaps, and user images. In some embodiments, the system 58 can be connected to a server 64 on a network. The server 64 can include a database 66 and the system 58 can also store information such as algorithms, original images, watermark data, watermark bitmaps, and user images on the database 66. In addition, an owner can transmit the user images to users via the network.

For the purposes of this disclosure a computer-readable medium stores computer data, which data can include computer program code that is executable by a computer, in machine readable form. By way of example, and not limitation, a computer-readable medium can comprise computer-readable storage media, for tangible or fixed storage of data, or communication media for transient interpretation of code-containing signals. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data. Computer-readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Embodiments of the system described above can be considered robust yet unobtrusive. The combination of techniques described above can allow for reliable protection of many types of images and extraction of very subtle watermarks from such images. It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A digital watermarking system for producing a watermarked image from an original image, the system comprising:
a storage unit which tangibly stores watermarking algorithms, the original image, watermark data, and the watermarked image; and
a processor which executes the watermarking algorithms to encode the watermark data,
create a watermark bitmap template at a first desired size and resolution, the watermark bitmap template including at least one watermark bitmap of the encoded watermark data,
load and scale the original image to a second desired size and resolution,
composite the watermark bitmap template and the scaled original image to produce the watermarked image by
aligning the watermark bitmap template and the scaled original image, and
programmatically modifying pixel values of the scaled original image near positions where the watermark bitmap and the scaled original image overlap, and
store the watermarked image in the storage unit.

2. The system of claim 1 wherein the original image is from a sequence of original images and the processor executes the watermarking algorithms to create a page number identification watermark bitmap, and composite the page number identification watermark bitmap and the scaled original image.

3. The system of claim 1 wherein the first desired size and resolution is equal to the second desired size and resolution.

4. The system of claim 1 wherein the first desired size and resolution is less than the second desired size and resolution.

5. The system of claim 1 and further comprising the processor executing the watermarking algorithms to extract at least a portion of the watermark bitmap template from the watermarked image by comparing corresponding pixels of color channels of the original image from the watermarked image.

6. The system of claim 1 wherein the at least one watermark bitmap includes a plurality of watermark data elements, the watermark data elements are monochromatic blocks rectangular in shape, and a length and a width of the watermark data elements are each a multiple of eight pixels.

7. The system of claim 1 wherein the pixel values include color bits of a red channel, a green channel, and a blue channel, and the pixel values are modified between about 1% and about 3% of a color range in at least one of the red channel, the green channel, and the blue channel.

8. The system of claim 1 and further comprising the processor executing the watermarking algorithms to determine unacceptable compositing areas in the original image and, during compositing, apply no modifications to the pixel values at positions corresponding to the unacceptable compositing areas.

9. The system of claim 1 and further comprising the processor executing the watermarking algorithms to create and insert data cross-checks within the encoded watermark data.

10. The system of claim 1 and further comprising the processor executing the watermarking algorithms to modify the watermark data before encoding it, wherein modifying the watermark data includes one of permuting the watermark data and applying a logic operation to one or more bytes of the watermark data.

11. The system of claim 1 wherein the at least one watermark bitmap is positioned at a fixed-interval pixel boundary on the watermark bitmap template.

12. A digital watermarking system for producing a watermarked image from an original image, the system comprising:
a storage unit which tangibly stores watermarking algorithms, the original image, watermark data, and the watermarked image; and
a processor which executes the watermarking algorithms to encode the watermark data,
create a watermark bitmap template at a first desired size and resolution, the watermark bitmap template including the encoded watermark data in the form of a barcode,
load and scale the original image to a second desired size and resolution,
composite the watermark bitmap template and the scaled original image to produce the watermarked image, and
store the watermarked image in the storage unit.

13. The system of claim 12 and further comprising the processor executing the watermarking algorithms to remove a portion of the barcode in the watermark bitmap template before compositing the watermark bitmap template and the scaled original image.

14. The system of claim 12 wherein the first desired size and resolution is equal to the second desired size and resolution.

15. The system of claim 12 wherein the first desired size and resolution is less than the second desired size and resolution.

16. The system of claim 12 wherein the watermark bitmap template includes a plurality of watermark bitmaps, where each of the plurality of watermark bitmaps includes the watermark data in the form of a barcode.

17. A method for watermarking a sequence of original images, the method comprising:

providing a computer including computer readable storage media for tangibly storing watermarking algorithms and a processor for executing the watermarking algorithms;

encoding watermark data, creating at least one watermark bitmap template at a first desired size and resolution, the watermark bitmap template including at least a portion of the encoded watermark data in the form of a barcode, loading and scaling each of the sequence of original images to a second desired size and resolution, compositing the at least one watermark bitmap template and each of the sequence of scaled original images to produce a sequence of watermarked images, and storing the sequence of watermarked images in the computer readable storage media.

18. The method of claim 17 wherein the at least one watermark bitmap template includes a plurality of watermark bitmap templates and at least one of the plurality of watermark bitmap templates is composited with each of the scaled original images to create an identifying combination of watermark bitmap templates in the sequence of watermarked images.

19. The method of claim 17 wherein the at least one watermark bitmap template includes a plurality of watermark bitmap templates and each of the plurality of watermark bitmap templates includes the barcode positioned at a different location on a fixed-interval pixel boundary.

20. The method of claim 17 and further comprising creating a page number identification watermark bitmap corresponding to each of the sequence of original images, and compositing the page number identification watermark bitmaps and the corresponding scaled original images.

21. The method of claim 17 wherein the at least one watermark bitmap template includes a plurality of watermark bitmap templates, wherein each of the plurality of watermark bitmap templates includes a different portion of the encoded watermark data.

\* \* \* \* \*